(12) United States Patent
Fattal et al.

(10) Patent No.: US 8,970,958 B2
(45) Date of Patent: Mar. 3, 2015

(54) BROADBAND OPTICAL BEAM SPLITTERS

(75) Inventors: David A. Fattal, Mountain View, CA (US); Michael Renne Ty Tan, Menlo Park, CA (US); Zhen Peng, Foster City, CA (US); Marco Fiorentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 74 days.

(21) Appl. No.: 13/980,472

(22) PCT Filed: Jan. 31, 2011

(86) PCT No.: PCT/US2011/023213
§ 371 (c)(1),
(2), (4) Date: Jul. 18, 2013

(87) PCT Pub. No.: WO2012/105943
PCT Pub. Date: Aug. 9, 2012

(65) Prior Publication Data
US 2013/0301137 A1    Nov. 14, 2013

(51) Int. Cl.
*G02B 27/10* (2006.01)
*G02B 27/14* (2006.01)
*G02B 6/293* (2006.01)

(52) U.S. Cl.
CPC .......... *G02B 27/1006* (2013.01); *G02B 27/106* (2013.01); *G02B 27/1086* (2013.01); *G02B 6/29367* (2013.01)
USPC ........................................................ 359/618

(58) Field of Classification Search
CPC .......... G02B 27/14; G02B 5/30; G02B 27/28; F21V 9/14
USPC ................................................. 359/618, 634
See application file for complete search history.

(56) References Cited

U.S. PATENT DOCUMENTS

| | | | |
|---|---|---|---|
| 5,608,825 A | 3/1997 | Ip | |
| 6,008,920 A | 12/1999 | Hendrix | |
| 6,542,306 B2 | 4/2003 | Goodman | |
| 7,088,877 B2 | 8/2006 | Liu et al. | |
| 2002/0164105 A1* | 11/2002 | Simpson et al. | 385/11 |
| 2004/0047039 A1 | 3/2004 | Wang et al. | |
| 2006/0007386 A1 | 1/2006 | Cavanaugh et al. | |
| 2010/0165598 A1 | 7/2010 | Chen et al. | |

FOREIGN PATENT DOCUMENTS

KR   10-2009-0008942 A    1/2009

OTHER PUBLICATIONS

Hecht, Wavelength Division Multiplexing—WDM, http://www.zone.ni.com/devzone/cda/ph/p/id/303 published Sep. 6, 2006.
(Continued)

*Primary Examiner* — James Greece
(74) *Attorney, Agent, or Firm* — Hewlett-Packard Patent Department

(57) ABSTRACT

A broadband optical beam splitter can comprise a non-metallic high contrast grating including a substrate and an array of posts attached to a surface of the substrate. The grating can have a subwavelength period with respect to a preselected optical energy wavelength, the preselected optical energy wavelength within the range of 400 nm to 1.6 μm. Additionally, the broadband optical beam splitter can have a bandwidth of 80 nm to 120 nm and can have an optical energy loss of less than 5%.

15 Claims, 4 Drawing Sheets

(56) References Cited

OTHER PUBLICATIONS

International Search Report, Korean IPO, Oct. 28, 2011, PCT Patent Application No. PCT/US2011/023213. Filed Jan. 31, 2011.

Gong et al., Two-dimensional Higher-diffraction-order Optical Bean Splitter Based on Phenanthrenequinone-doped Poly(methyl Methacrylate) Photopolymer, Optics and Lasers in Engineering, 47 (2009), pp. 662-666.

* cited by examiner

BROADBAND OPTICAL BEAM SPLITTERS

BACKGROUND

Light beams or optical signals are frequently used to transmit digital data, for example, in fiber optic systems for long-distance telephony and internet communication. Additionally, much research has been done regarding the use of optical signals to transmit data between electronic components on circuit boards.

Consequently, optical technology plays a role in modern telecommunications and data communication. Examples of optical components used in such systems include optical or light sources such as light emitting diodes and lasers, waveguides, fiber optics, lenses, optical beam splitters, photo-detectors, optical sensors, optically-sensitive semiconductors, optical modulators, and other optical devices.

Systems making use of optical components often rely upon the precise manipulation of optical energy, such as a beam of light, to accomplish a desired task. This is often true in systems utilizing light for high-speed, low-energy communication between two nodes. The manipulation of an optical signal may include selectively encoding information on a light beam of the optical signal and directing the light beam of the optical signal to a sensor that detects the encoded light beam. As such, research and developmental efforts continue in the field of fiber optic systems.

DETAILED DESCRIPTION

Figure 1:
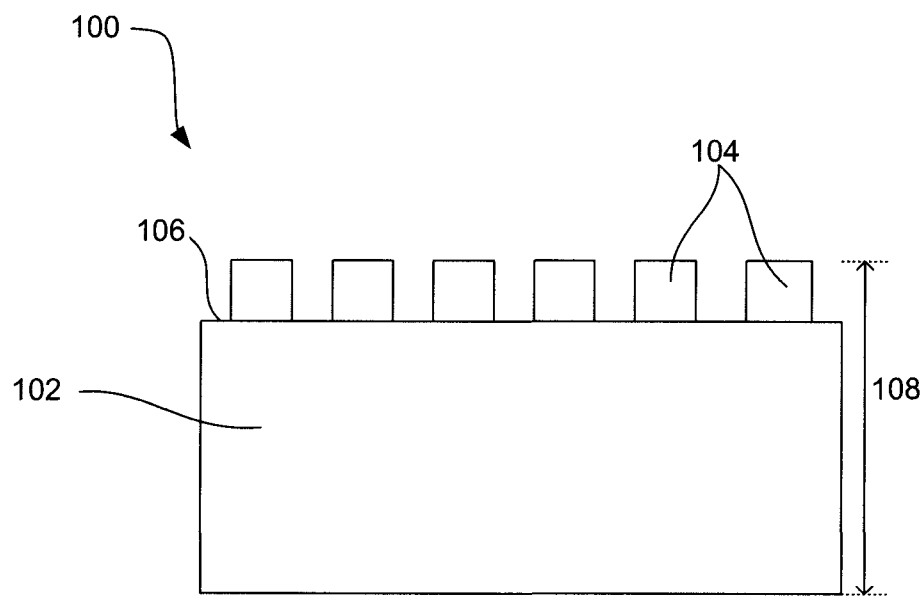
FIG. 1 is a cross-sectional view of a non-metallic high contrast grating in accordance with examples of the present disclosure.

Light beams or optical signals are frequently used to transmit digital data. For example, optical signals can be used to transmit data over large distances, between electronic components on nearby circuit boards, or between electronic components on a single circuit board. Optical signals can be routed using waveguides. Waveguides can carry optical energy by imposing boundaries which control the expansion of the optical energy and guide the optical energy or optical signals to a desired location. Optical communication can also provide interconnection between the optical channel and various other devices such as backplanes, electronic devices, semiconductor lasers, photo-detectors, other components. In some optical systems, optical communication can benefit greatly from the use of optical beam splitters.

Optical beam splitters are optical devices which can split an incident light beam (e.g. a laser beam) into two or more beams, which may or may not have the same optical power. Additionally, such optical beam splitters can be broadband, in that they can function over a bandwidth of 50 nm, or some examples, over 100 nm. The formation of a relatively simple broadband optical beam splitter that can be pellicle, but overcome the optical losses typically associated with such systems would provide advantages over some of the state of the art beam splitters.

With this in mind, it has been recognized that a broadband optical beam splitter can be manufactured that overcomes the optical losses associated with many broadband optical beam splitters known in the art. Specifically, a broadband optical beam splitter can comprise a non-metallic high contrast grating including a substrate and an array of posts attached to a surface of the substrate. The grating can have a subwavelength period with respect to a preselected optical energy wavelength, the preselected optical energy wavelength within the range of 400 nm to 1.6 µm. Additionally, the broadband optical beam splitter can have a bandwidth of 80 nm to 120 nm and can have an optical energy loss of less than 5%.

In another embodiment, an optical system can comprise the optical beam splitter described above, and further comprise a reflective material to reflect the second portion of the optical energy. The broadband optical beam splitter can transmit a first portion of optical energy and reflect a second portion of the optical energy. In a related embodiment, the optical system further comprises a second broadband optical beam splitter to receive the second portion of the optical energy after reflection from the reflective material, the second broadband optical beam splitter to transmit a third portion of the optical energy and reflect a fourth portion of the optical energy. In one specific embodiment, the substrate of the broadband optical beam splitter and the substrate of the second broadband optical beam splitter are from a common structure.

Additionally, a method of manufacturing a broadband optical beam splitter is also disclosed and will be discussed in greater detail hereinafter. That being said, it is noted that when discussing the broadband optical beam splitter or the aforementioned methods, each of these discussions can be considered applicable to each of these examples, whether or not they are explicitly discussed in the context of that example. Thus, for example, in discussing details about the broadband optical beam splitter per se, or method making such a beam splitter, such discussion also refers to the other examples, and vice versa.

Turning now to the FIGS., FIG. 1 is a cross-sectional view of a non-metallic high contrast grating 100. The non-metallic high contrast grating can include a substrate 102 supporting an array of posts 104 attached to a surface 106 of the substrate. The substrate can be manufactured from any suitable low-index material, including without limitation silicon dioxide, silicon nitride, combinations thereof, though this list is not intended to be limiting. Regarding the posts, they can be formed from a dielectric material having a high refractive index. The dielectric material can comprise silicon, GaAs, or other III-V or II-VI crystals, insulating crystals, amorphous films such as SiC, and SiN, and can combinations thereof. In one aspect, the dielectric material can comprise silicon, including oxides thereof. Generally, the substrate can have a lower refractive index than the array of posts. In one example, the substrate can have a refractive index of 1 to 2 and the posts can have a refractive index of 2.5 to 4. Generally, the high contrast grating, as a whole, can have a refractive index of at least 3. In one example, the high contrast grating can have a refractive index of at least 3.5. Furthermore, the broadband optical beam splitter can have a thickness 108 of less than 400 nm, e.g., from 40 nm to 400 nm. In another example, the broadband optical beam splitter can have a thickness of less than 200 nm, e.g., from 40 nm to 200 nm.

Figure 2:
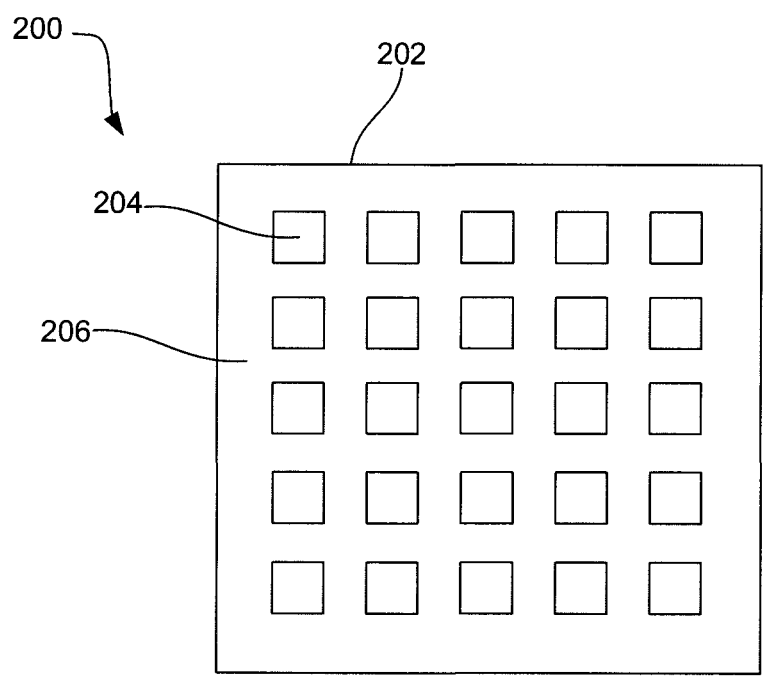
FIG. 2 is a top view of a non-metallic high contrast grating in accordance with examples of the present disclosure.

FIG. 2 is a top view of a non-metallic high contrast grating 200 having a substrate 202 with an array of posts 204 attached thereto. Specifically, an array of posts can be attached to a surface 206 of the substrate. The posts can be spaced apart from each other to provide form a specific period and duty cycle, thus, allowing for specific transmission/reflection ratios.

Figure 3:
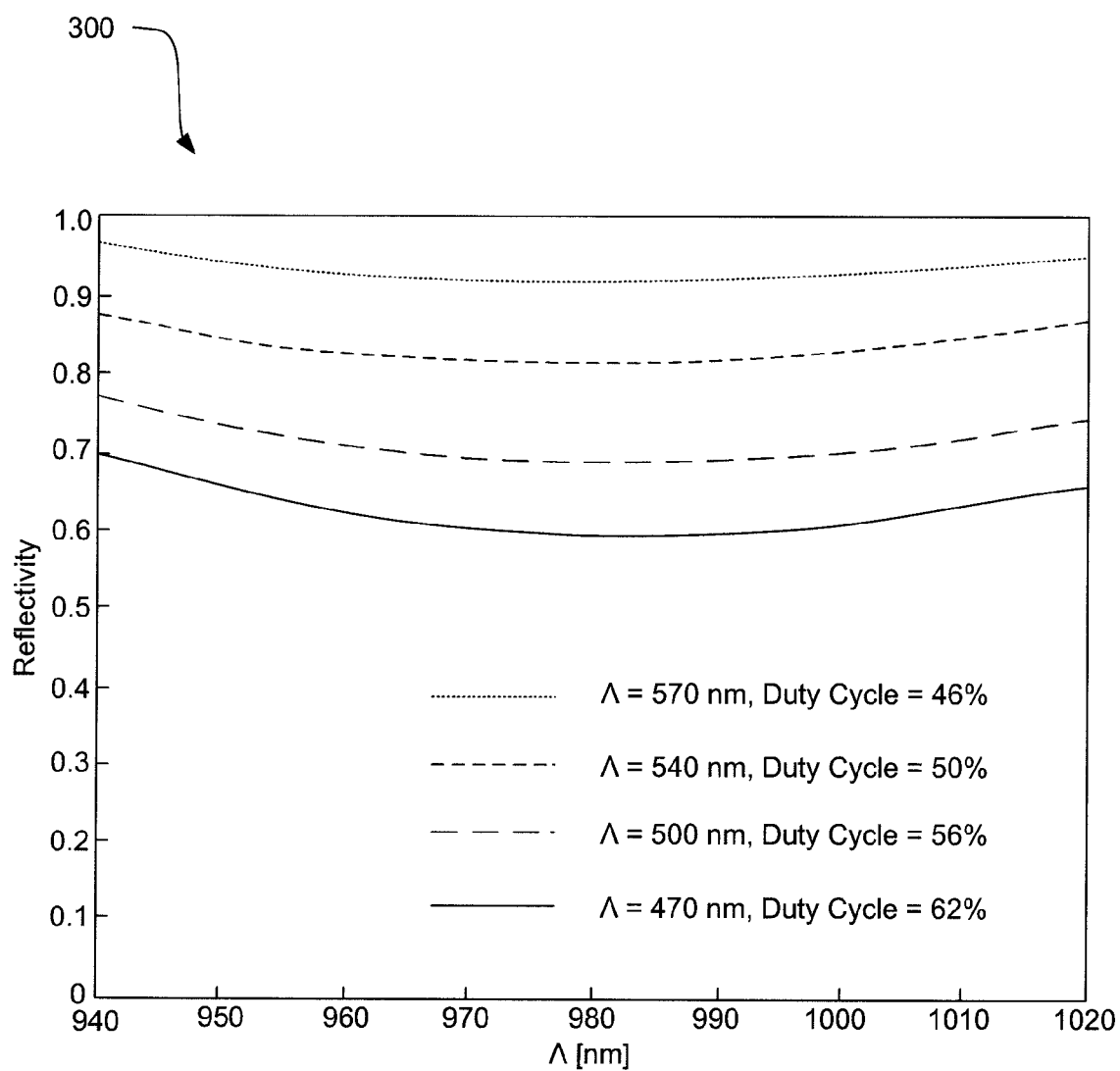
FIG. 3 is a graph of reflectivity vs. wavelength for various wavelengths and duty cycles in accordance with examples of the present disclosure.

FIG. 3 sets forth a specific example graph of reflectivity vs. wavelength for a non-metallic high contrast grating having silicon oxide posts on an oxide substrate with a lower refractive index than the posts. The absorbance of the non-metallic high contrast grating was less than 0.1%. As shown in FIG. 3, the non-metallic high contrast grating provided a controlled minimum reflectivity of about 980 nm for wavelengths ranging from 570 nm to 470 nm (spanning over 100 nm) using duty cycles ranging from 46% to 62%. As such, the present disclosure provides for a broadband optical beam splitter having a bandwidth of at least about 100 nm with an optical loss of less than 5%.

Generally, the optical loss can be measured as the amount of optical energy that is not either transmitted or reflected by the broadband optical beam splitter. Typically, such losses can be due to absorption of the optical energy by the materials of the optical beam splitter. In one example, the present broadband optical beam splitters can provide an optical loss of less than 3%. In another example, the optical loss can be less than 1%. In yet another example, the optical losses can be less than 0.5%.

The optical energy described herein can be any energy having a wavelength of 400 nm to 1.6 µm. In one example, the optical energy can be visible light. In another example, the optical energy can be or include ultraviolet light. While the optical energy generally includes a broad range of wavelengths, the present broadband optical beam splitter can be useful for optical energy over a bandwidth of 80 nm to 120 nm. As such, the broadband optical beam splitter can be configured to split an optical beam having a specific wavelength, e.g., 980 nm, and can include wavelengths of about 40 nm to 60 nm on either side of that specific wavelength, thereby providing a broadband effect.

Figure 4:
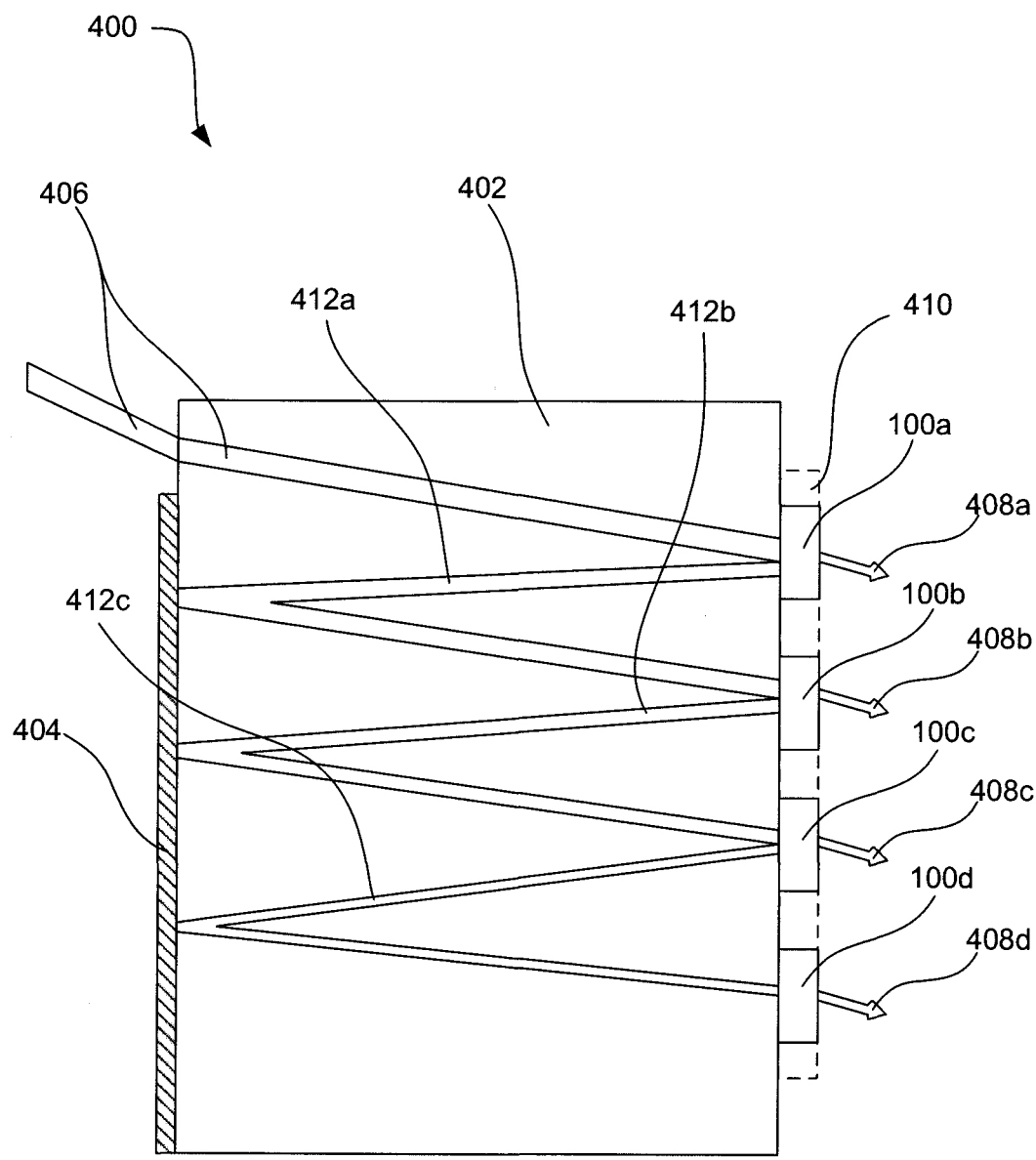
FIG. 4 is a cross-sectional view of an optical device having multiple broadband optical beam splitters in accordance with examples of the present disclosure.

The broadband optical beam splitters described herein can be used in various optical devices and optical tapping applications. Such devices can include interferometers, autocorrelators, cameras, projectors, laser systems, optical buses, etc. In one example, as shown in FIG. 4, an optical device 400 can comprise any of the broadband optical beam splitters, e.g. 100a. Generally, the optical broadband beam splitters 100a-d can comprise a separate array of posts attached to the substrate 402 thereby forming individual broadband optical beam splitting domains on a single substrate 410, or on separate substrates (shown separately without phantom line 410). In one example, the device can be fabricated by depositing a dielectric material onto the surface of the substrate and etching the individual arrays of posts in a single litho/etch/deposition step. In one aspect, each of the individual arrays of posts can have a different period and/or duty cycle allowing for tailoring of the optical splitting. In one example, an optical device can comprise a second broadband optical beam splitter, e.g., 100b. As such, the broadband optical beam splitters can be the same or different. In one example, the broadband optical beam splitters can have different transmission/reflection ratios. Such transmission/reflections ratios can be determined by a period and duty cycle of each of the broadband optical beam splitters; e.g. a first broadband optical beam splitter can have a first period and a first duty cycle and the second broadband optical beam splitter can have a second period and a second duty cycle, where the first/second periods and/or the first/second duty cycles are the same or different. Such tenability can allow for the design of specific broadband optical beam splitters for specific wavelengths. As discussed herein, the broadband optical beam splitters can be configured to have a transmission/reflection ratio of optical energy that significantly reduces optical energy loss, e.g., less than 5%. Additionally, the subwavelength period and the duty cycle can provide a minimum reflectivity at a specific wavelength of light ranging from 400 nm to 1.6 µm.

As such, as shown in FIG. 4, an optical device 400 can include multiple broadband optical beam splitters 100a, 100b, 100c, and 100d. The broadband optical beam splitters can be configured to split an optical beam 406 multiple times to provide a desired power level for a given application. Such devices can further include a reflective layer 404 that reflects the reflected portion of the optical energy from consecutive individual broadband optical beam splitters (100a, 100b, 100c, and 100d) thereby allowing for a consistent transmitted optical energy 408a, 408b, 408c, and 408d. The transmitted optical energy 408a, 408b, 408c, and 408d can be substantially the same. This can be accomplished by varying the period and duty cycle of each broadband optical beam splitter to account for the lowered amount of energy split off from the prior adjacent beam splitter. Thus, for example, if beam splitter 100a is used to split off a certain amount of power, then beam splitter 100b can be configured to split off a higher percentage of the remaining power to account for a lower amount of initial power, and so forth. In one aspect, the transmitted optical energy can substantially the same as one another, e.g., within 5% or even within 1% of one another. Thus, in one specific embodiment, transmitted optical energy 408a-d can all be substantially the same in power output, while the optical beam 406 is stepped down in power at each of the respective beam splitters 100a-d.

That being said, the broadband optical beam splitters can have varying transmission/reflection ratios. Such ratios can be varied and tailored depending on the materials used, the application for which the beam splitter is to be used, the bandwidth of optical energy to be used, etc. In one example, the reflectivities can be from 60% to 95%. In another example, the reflectivities can be from 10% to 95%, or even 10% to 99%. The broadband optical beam splitters can also be non-polarizing. Additionally, the broadband optical beam splitters can have a near-normal incidence (e.g., 5° or less).

For illustrative purposes, and continuing with FIG. 4, the broadband optical beam splitter 100a can receive an optical beam 406, where the splitter transmits a first portion of optical energy 408a and reflects a second portion of the optical energy 412a. The second portion of optical energy can then be reflected by the reflective material 404 and redirected to a second broadband optical beam splitter 100b. Thus, the second broadband optical beam splitter 100b is positioned and configured to transmit a third portion of the optical energy 408b and reflect a fourth portion of the optical energy 412b. This can be repeated, as shown, for as many cycles as is practical or desired for a given application.

Figure 5:
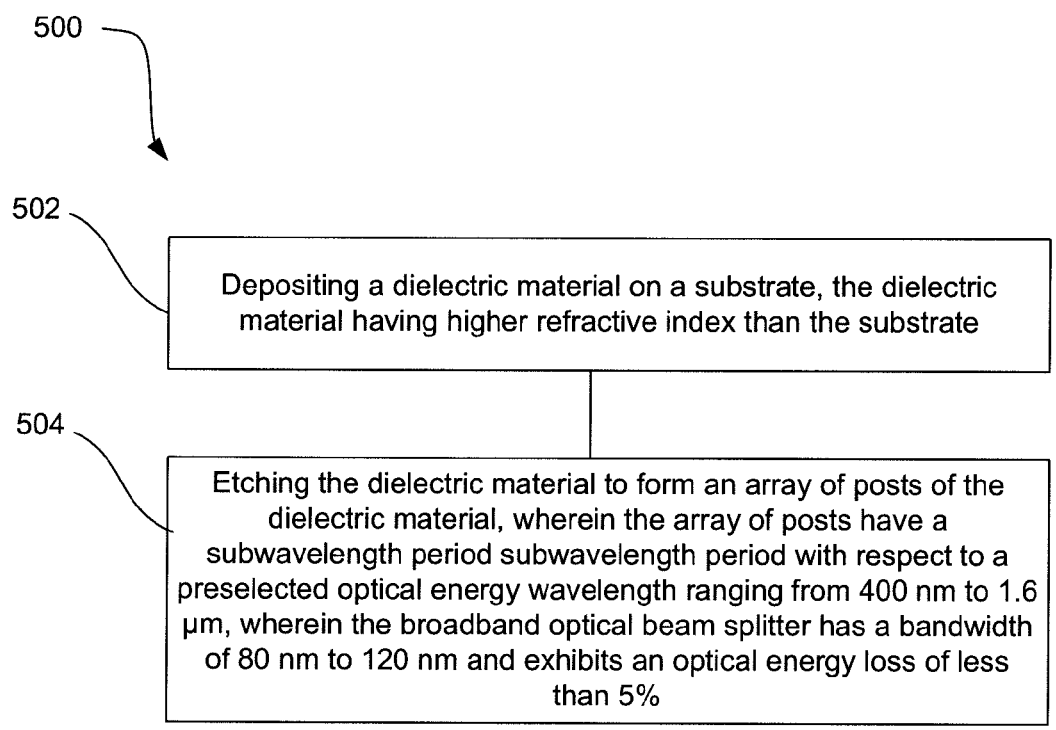
FIG. 5 is a flow diagram of a method of manufacturing a broadband optical beam splitter in accordance with examples of the present disclosure.

FIG. 5 provides a flow chart of a method 500 of manufacturing a broadband optical beam splitter, comprising depositing 502 a dielectric material on a substrate, the dielectric material having higher refractive index than the substrate. The method also includes etching 504 the dielectric material to form an array of posts of the dielectric material, wherein the array of posts have a subwavelength period the dielectric material to form an array of posts of the dielectric material, wherein the array of posts have a subwavelength period with respect to a preselected optical energy wavelength ranging from 400 nm to 1.6 µm, and wherein the broadband optical beam splitter has a bandwidth of 80 nm to 120 nm and exhibits an optical energy loss of less than 5%.

In these embodiments, the dielectric material can be deposited by varying techniques, including but not limited to, chemical vapor deposition (CVD) techniques such as plasma enhanced CVD, ultrahigh vacuum CVD, aerosol assisted CVD, atomic layer CVD, etc. Deposition can also be carried out using low-pressure techniques such as evaporation, sputtering, plasma deposition, and low-pressure CVD. Techniques at standard pressure can also be used such as thermal oxidation, chemical vapor deposition, anodization, electrophoresis, spin on, spray on, silk screening, and other techniques such as physical vapor deposition, wafer bonding, roller coating, offset printing, and centrifugation/sedimentation.

Once the dielectric material has been deposited on the substrate, the posts can be formed by removal of excess material. Removal can be performed by etching processes, for example. Etching techniques include those that allow for removal of a material to form a desired pattern. Such techniques can include wet etching such as potassium hydroxide etching (KOH), hydrofluoric acid etching (HF), buffered oxide etching (BOE), hydrofluoric acid-nitric acid-acetic acid etching (HNA), etc., as well as dry etching such as reactive-ion etching (RIE), plasma, deep reactive ion etching (DRIE), reverse sputtering, etc. Alternatively, photo-etching, non-toxic etching, lithography, etc. can also be used.

The present devices and methods can include manufacturing several beam splitters with different ratios fabricated on one plane with one litho/etch/deposition step. Such process can greatly reduce the fabrication cost and time compared to optical beam splitters found in the prior art, e.g., dielectric stacks.

While the forgoing examples are illustrative of the principles of the present technology in particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A broadband optical beam splitter, comprising a non-metallic high contrast grating including a substrate and an array of posts attached to a surface of the substrate, wherein the grating has a subwavelength period with respect to an optical beam having a preselected optical energy wavelength range within the range of 400 nm to 1.6 µm, and wherein the broadband optical beam splitter has a bandwidth of 80 nm to 120 nm and exhibits an optical energy loss of less than 5%.

2. The broadband optical beam splitter of claim 1, wherein the optical beam is visible light.

3. The broadband optical beam splitter of claim 1, wherein the array of posts is formed from a dielectric material, and wherein the substrate has a lower refractive index than the array of posts.

4. The broadband optical beam splitter of claim 3, wherein the dielectric material comprises silicon, GaAs, III-V crystals, II-VI crystals, insulating crystals, amorphous films of SiC or SiN, or combinations thereof.

5. The broadband optical beam splitter of claim 1, wherein the non-metallic high contrast grating has a refractive index of at least 3, and from 10% to 99% reflectivity.

6. The broadband optical beam splitter of claim 1, wherein the broadband optical beam splitter as a whole has a thickness from 40 nm to 400 nm.

7. An optical system, comprising:
a broadband optical beam splitter to transmit a first portion of optical energy and to reflect a second portion of the optical energy, the broadband optical beam splitter including a non-metallic high contrast grating including a substrate and an array of posts attached to a surface of the substrate, wherein the non-metallic high contrast grating grating has a subwavelength period with respect to an optical beam having a preselected optical energy wavelength range within the range of 400 nm to 1.6 µm, and wherein the broadband optical beam splitter has a bandwidth of 80 nm to 120 nm and exhibits an optical energy loss of less than 5%; and
a reflective material to reflect the second portion of the optical energy.

8. The optical system of claim 7, further comprising a second broadband optical beam splitter to receive the second portion of the optical energy after reflection from the reflective material, the second broadband optical beam splitter to transmit a third portion of the optical energy and reflect a fourth portion of the optical energy.

9. The optical system of claim 8, wherein the second optical broadband beam splitter comprises a non-metallic high contrast grating including a substrate and an array of posts attached to a surface of the substrate, wherein the non-metallic high contrast grating has a subwavelength period with respect to an optical beam having a preselected optical energy wavelength range within the range of 400 nm to 1.6 µm, and wherein the second broadband optical beam splitter has a bandwidth of 80 nm to 120 nm and exhibits an optical energy loss of less than 5%.

10. The optical system of claim 9, wherein the subwavelength period of the broadband optical beam splitter and the second broadband optical beam splitter are different such that the first portion of optical energy from the broadband optical beam splitter and the third portion of optical energy from the second broadband optical beam splitter are substantially the same.

11. The optical system of claim 9, wherein the substrate of the broadband optical beam splitter and the substrate of the second broadband optical beam splitter are a common structure.

12. A method of manufacturing a broadband optical beam splitter, comprising:
depositing a dielectric material on a substrate, the dielectric material having higher refractive index than the substrate; and
etching the dielectric material to form an array of posts of the dielectric material, wherein the array of posts have a subwavelength period subwavelength period with respect to a preselected optical energy wavelength ranging from 400 nm to 1.6 µm, wherein the broadband optical beam splitter has a bandwidth of 80 nm to 120 nm and exhibits an optical energy loss of less than 5%.

13. The method of claim 12, wherein the step of etching the dielectric material includes forming a second array of posts of the dielectric material.

14. The method of claim 13, wherein the second array of posts has a second subwavelength period that is different than the first subwavelength period.

15. The method of claim 13, the step of etching of the array of posts and the second array of posts is within a common layer of the dielectric material.

* * * * *

UNITED STATES PATENT AND TRADEMARK OFFICE
CERTIFICATE OF CORRECTION

| | |
|---|---|
| PATENT NO. | : 8,970,958 B2 |
| APPLICATION NO. | : 13/980472 |
| DATED | : March 3, 2015 |
| INVENTOR(S) | : David A. Fattal et al. |

It is certified that error appears in the above-identified patent and that said Letters Patent is hereby corrected as shown below:

In the claims

In column 6, line 8 approx., in Claim 7, delete "grating grating" and insert -- grating --, therefor.

In column 6, line 51 approx., in Claim 12, delete "subwavelength period subwavelength period" and insert -- subwavelength period --, therefor.

Signed and Sealed this
Third Day of November, 2015

Michelle K. Lee
*Director of the United States Patent and Trademark Office*